June 8, 1937.  H. H. SCHNECKLOTH  2,082,911
SWITCH
Filed Nov. 8, 1935   5 Sheets-Sheet 1

INVENTOR
BY  H.H. SCHNECKLOTH

ATTORNEY

June 8, 1937.　　　H. H. SCHNECKLOTH　　　2,082,911
SWITCH
Filed Nov. 8, 1935　　　5 Sheets-Sheet 2

INVENTOR
H. H. SCHNECKLOTH
BY
ATTORNEY

June 8, 1937.  H. H. SCHNECKLOTH  2,082,911
SWITCH
Filed Nov. 8, 1935   5 Sheets-Sheet 3

INVENTOR
H. H. SCHNECKLOTH
BY
ATTORNEY

INVENTOR
H. H. SCHNECKLOTH
BY
ATTORNEY

June 8, 1937.   H. H. SCHNECKLOTH   2,082,911
SWITCH
Filed Nov. 8, 1935   5 Sheets-Sheet 5

INVENTOR
H. H. SCHNECKLOTH
BY
ATTORNEY

Patented June 8, 1937

2,082,911

UNITED STATES PATENT OFFICE 2,082,911

SWITCH

Harry Howard Schneckloth, Forest Hills, N. Y., assignor to American Telephone and Telegraph Company, a corporation of New York Application November 8, 1935, Serial No. 48,926

13 Claims. (Cl. 179—27.54)

This invention relates to automatic switches and particularly to those employed in telephone systems.

The objects of the invention are to enlarge the contact-making capacity of automatic switches without increasing the amount of apparatus used for operating the contacts; to reduce the current consumption incident to their operation; and otherwise to improve switches of this character.

In the patent to P. W. Sheatsley, No. 2,066,490, granted Jan. 5, 1937, there is disclosed and claimed a cross-bar switch in which the cross-point contacts operated by the conjoint action of two cross-bars are held independently to permit the release of said bars, and in which an operated contact set is subsequently released by the reoperation of one of said bars. And in the patent to P. W. Sheatsley, No. 2,066,491, granted Jan. 5, 1937, there is disclosed and claimed a cross-bar switch in which the operated contact set is held independently of the two operating bars and is released by the reoperation of both of said bars.

A feature of the present invention is a cross-bar switch of this general character disclosed in the patents above noted in which the number of separate contact sets controlled by a pair of bars and the associated magnets are increased without adding to the number of bars and magnets required. This is accomplished by adding extra sets of contact springs at each cross-point served by a horizontal bar and a vertical bar and providing a contact operating mechanism which operates to close selectively any desired one of the contact sets at that cross-point depending on the order in which the magnets are energized and deenergized. The contacts of any set, once operated, are held in operated condition to permit the release of the magnets and bars for further use. When it is desired to release any operated set of contacts at a cross-point, this is effected by again operating and releasing the associated magnets in a definite sequence depending on which set of contacts is involved.

The foregoing and other features of the invention will be set forth more in detail in the following specification and also in the appended claims.

In the drawings, which also form a part of the specification:

Figure 1:
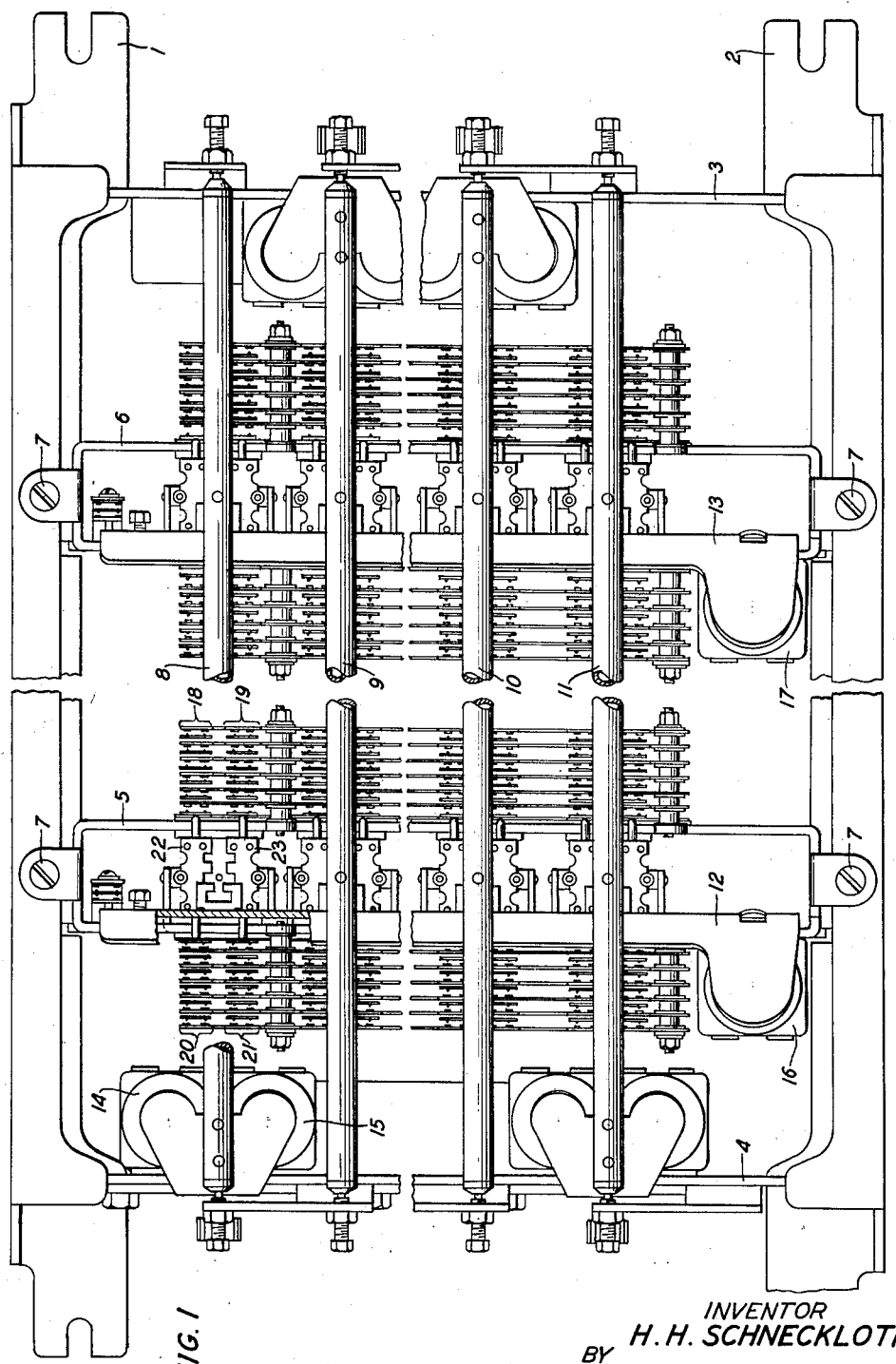
Figure 1 is a front view showing as a whole a cross-bar switch incorporating the features of this invention. In this figure certain duplicate parts have been broken away and omitted to conserve space.

The invention is applicable in general to switches of the cross-bar type in which the bars of a plurality of sets cooperate with each other to bring about the selective operation of a desired set of circuit-making contacts. A switch of this kind is shown and described in the application of J. N. Reynolds, Serial No. 702,453, filed December 15, 1933, granted as Patent 2,021,329, Nov. 19, 1935. In the Reynolds patent and in the switch illustrated herein the cross-bars are rendered active by imparting a rotary movement thereto. Other switches of this general kind make use of a sliding bar instead of the rotary bar, and the present invention may also be applied to switches of this kind.

Referring now to the drawings, the switch illustrated therein comprises upper and lower frame members 1 and 2, and two side members 3 and 4. The frame members 1 and 2 are channel-shaped whereas the side members 3 and 4 are L-shaped. The L-shaped members 3 and 4 fit into the channels of members 1 and 2 and are secured therein in any suitable manner, as by welding.

The contact sets and the contact operating mechanism are mounted in units on vertical mounting plates 5, 6, etc. These plates are secured by means of screws 7 to the upper and lower frame members 1 and 2. The number of these vertical units is determined by the desired capacity of the switch. The contact bank formed by the several mounting units may be considered as divided into two multiples, a horizontal multiple and a vertical multiple. The horizontal contact sets appearing at successive cross-points along a horizontal row are multipled together by means of strap wires not shown in the drawings. Likewise the cooperating vertical contact sets appearing at successive cross-points in a vertical row are multipled together. To effect a connection at any particular cross-point, it is necessary to bring about a closure between the horizontal contact springs and the corresponding vertical contact springs. This is accomplished by means of the contact selecting and operating mechanism which will be described hereinafter. Before taking up the operating mechanisms, however, a description will first be given of the crossbars which control the selection and operation of these mechanisms.

The contact selecting and operating mechanisms are operated by means of two sets of bars, the horizontal or select bars 8, 9, 10, 11 and the vertical or operating bars 12, 13. Each of the horizontal bars is common to two horizontal rows of contacts, an upper row and a lower row. For example, the horizontal bar 8 is common to the two uppermost horizontal rows of contacts shown in Fig. 1. For each horizontal bar there are provided two operating magnets, such as the magnets 14 and 15 associated with the horizontal bar 8. One magnet rotates the bar in one direction, and the other magnet rotates it in the opposite direction. As shown, the magnets for some of the bars are mounted on the frame member 3, and the magnets for the remaining horizontal bars are mounted on the opposite frame member 4.

The several vertical bars are attached for rotary movement to their respective vertical mounting plates. The vertical bars 12 and 13, for example, are mounted on the plates 5 and 6, respectively, and are operated in a rotary movement by the respective vertical magnets 16 and 17. Each of the vertical bars is common to two vertical rows of contacts. The bar 12 is common to the vertical rows shown at the right and left of the mounting plate 5; the bar 13 is common to the rows shown on the right and left of the mounting plate 6; and the same is true of the remaining bars of the switch structure.

Figure 22:
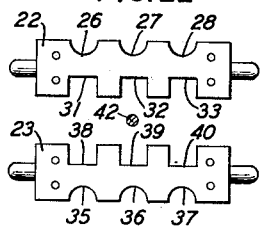
Fig. 22 is a detail of the contact operating mechanism.

From the foregoing it follows that each crosspoint or point of cooperation between a horizontal bar and a vertical bar is provided with four sets of contacts. In order to select and operate any one of the four different sets of contacts at a cross-point, there is provided a contact operating mechanism which is controlled by the action of the corresponding horizontal and vertical bars. One of these contact operating mechanisms is shown in considerable detail in the upper left corner of the switch in Fig. 1. This mechanism is common to the four sets of contacts 18, 19, 20 and 21. The contact operating mechanism, which is shown more clearly in the detailed figures, includes two spring operating plates 22 and 23. The upper plate 22 is flexibly mounted on springs 24, and 25, and the lower plate 23 is likewise mounted for movement independent of the plate 22. The detailed construction of these operating plates is shown more clearly in Fig. 22. The upper operating plate 22 has three notches 26, 27 and 28. A roller 29 mounted on the free end of the holding spring 30 rests in these notches to hold the plate 22 either in its central normal position or in one or the other of its operated positions. When the roller 29 engages the notch 27, the plate 22 rests in its normal position between the two sets of contact springs 18 and 20 to which this plate relates. In this position both of the contact sets 18 and 20 are open. When the plate 22 is moved to the right to close the contacts 18, the roller 29 is forced out of notch 27, because of the resiliency of the spring 30, and drops into the notch 26 to hold the plate 22 in its operated position after the moving force has been withdrawn. Likewise when the plate 22 is moved to the left to close the contacts 20, the roller 29 is forced out of the holding notch 27 and falls into the notch 28 to hold the plate in this operated position. On the under edge of the operating plate 22 are three rectangular notches 31, 32 and 33 corresponding in position to the holding notches 26, 27 and 28. The purpose of these notches is to receive the flexible operating finger 34 to move the plate 22 either to the right or the left, from and to its normal position. The lower operating plate 23, which serves to operate the other two sets of contacts 19 and 21, is likewise provided with holding notches 35, 36 and 37 and operating notches 38, 39, 40. This lower plate is held by means of a roller 41 mounted on a flexible spring and positioned to engage the notches 35, 36 and 37.

The contact operating plates at each crosspoint of the switch are operated to selectively close and to selectively open any of the four sets of contact springs at the cross-point by means of the conjoint operation of a horizontal bar and a vertical bar, the intersection of which identifies the cross-point. For example, the cross-point shown in Fig. 2 and in the upper left corner of the switch in Fig. 1 is identified by the intersection of horizontal bar 8 and vertical bar 12 and the operating plates 22 and 23 thereat are actuated by means of these two bars. To this end the horizontal bar 8 is provided with a flexible operating finger 42 which, when the bar is normal, projects to a point midway between the operating plates 22 and 23 and in vertical alignment with the notches 32 and 39, provided plates 22 and 23 are in their normal positions. The horizontal bar 8 and the other horizontal bars of the switch are equipped with one of these operating fingers for each cross-point in the switch. The vertical bar 12 is provided at the cross-point illustrated in Fig. 2 with an operating arm 43, the free end of which is overturned and recessed to provide upper and lower projections 44 and 45. When both vertical and horizontal bars are in their normal positions the flexible operating finger 42 lies outside the recess in the end of the arm 43 and in alignment with the entrance into said recess. The vertical bar 12 and the other vertical bars are provided with a plurality of these operating arms 43, each bar having one such operating arm for each of the cross-points in the corresponding vertical row.

Figure 2:
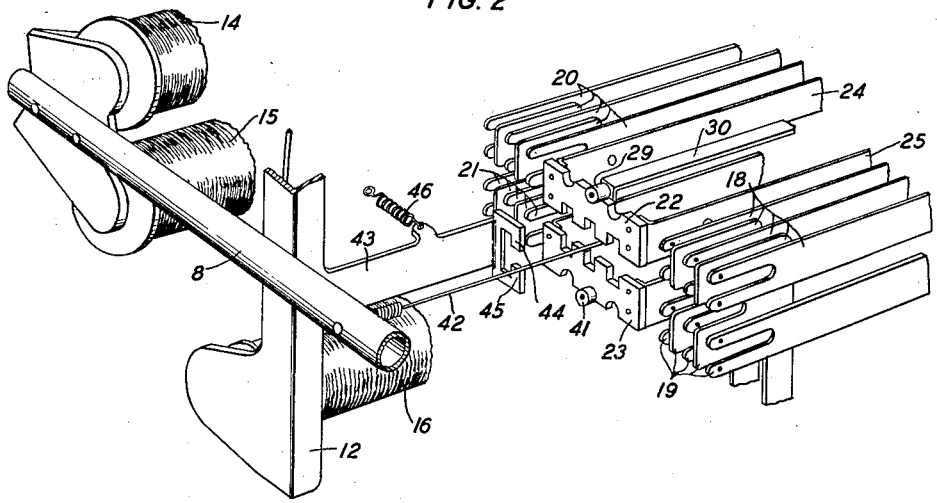
Fig. 2 is a fragmentary perspective of the essential operating elements of the switch.
Figure 3:
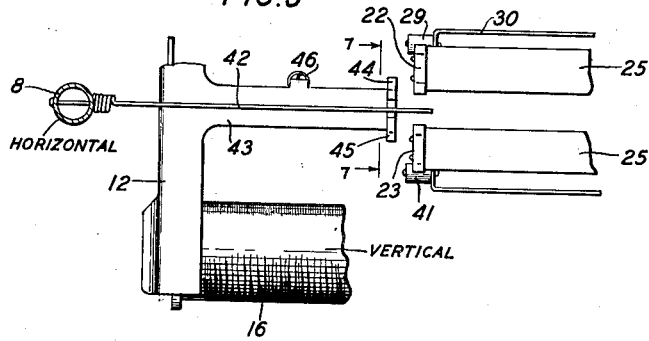
Figs. 3 and 4 are side views of a portion of the contact operating mechanism, illustrating the horizontal operating bar in two different positions.
Figure 4:
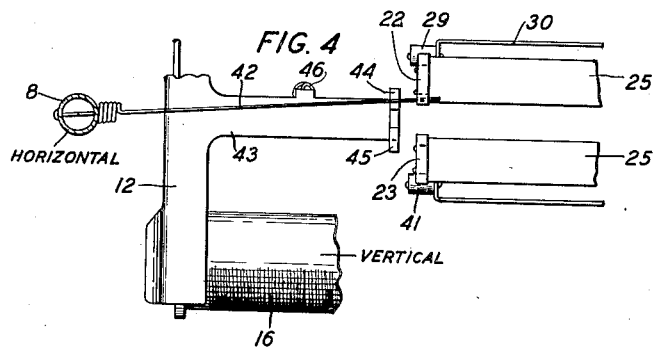
Figure 5:
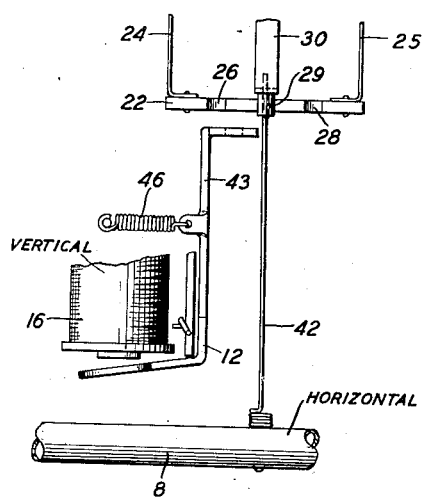
Figs. 5 and 6 are top views of the contact operating mechanism showing one of the vertical bars in two different positions.
Figure 6:
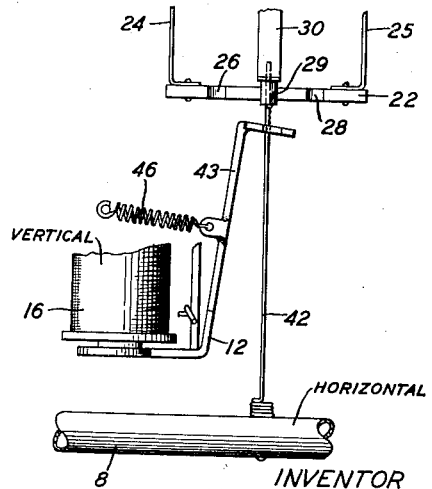
Figure 7:
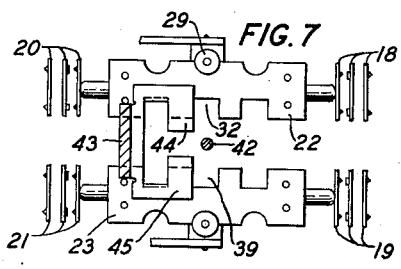
Figs. 7 to 21 are diagrams showing the contact operating elements in the different relative positions involved in the selective operation and release of the contact sets.
Figure 8:
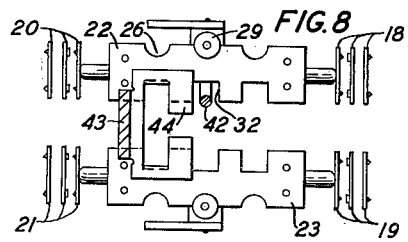
Figure 15:
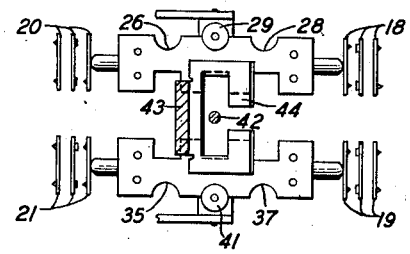

With the operating mechanism above described, including the contact operating plates 22 and 23, the flexible operating finger 42, and the operating arm 43, it is possible to select and operate any one of the four sets of contacts and to maintain the operated contacts in their closed condition after the horizontal and vertical bars have been released. With this mechanism it is also possible to select and release any operated set of contacts. These functions are accomplished by operating the horizontal and vertical bars in different sequences. By rotating the horizontal bar 8 upward from its normal position as seen in Figs. 2, 3 and 7 to its operated position as seen in Figs. 4 and 8, the finger 42 is positioned within the central notch 32 of the plate 22 and opposite the exterior surface of the projection 44. Likewise by rotating the horizontal bar 8 downwardly, the finger 42 is positioned within the central notch 39 of the plate 23 and opposite the exterior surface of the projection 45. In either of these cases the rotation of the vertical bar 12 following the positioning of the finger 42 causes the arm 43 to move to the right causing either the projection 44 or the projection 45, as the case may be, to engage the finger 42 and move either plate 22 or plate 23 to the right. Should, however, the vertical bar be operated first, while the horizontal bar 8 is in its normal position, the operating arm 43 moves from its normal position as seen in Figs. 2 and 5 to its operated position as seen in Figs. 6 and 15 such that the operating finger 42 now rests within the recess in the overturned portion of said arm 43. If, thereafter, the horizontal bar 8 is rotated either upwardly or downwardly the finger 42 takes up a position within the recess behind either the projection 44 or the projection 45, the projecting end and the finger 42 at the same time entering the central notch in either plate 22 or plate 23. If, now, while the horizontal bar is maintained operated, the vertical magnet 16 is deenergized the spring 46 withdraws the bar 12 and the arm 43. As the arm 43 returns to its normal position the inside surface of projection 44 or projection 45, as the case may be, forces the finger 42 to the left, thereby moving either the plate 22 or the plate 23 to the left-hand position.

Figure 9:
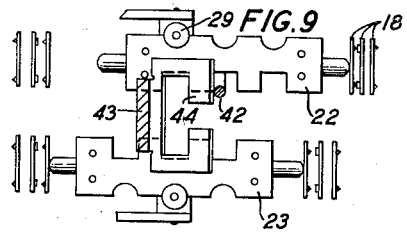
Figure 10:
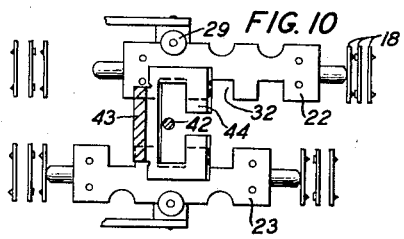
Figure 11:
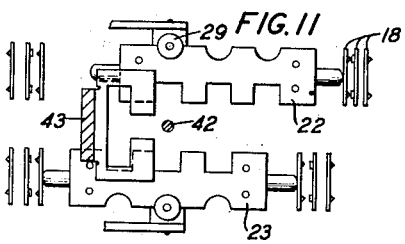

With the foregoing description of the structure and operation of the switch in mind specific descriptions will now be given, in connection particularly with Figs. 7 to 21, inclusive, of the relative and sequential operations of the different members involved in the selective operation and release of the different contact sets. Assume first that all of the four contact sets 18, 19, 20 and 21 are open, that the horizontal and vertical bars 8 and 12 are at normal, and that it is desired to close contact set 18. Fig. 7 shows all of the parts in their normal position the same as in Fig. 2. To selectively operate the contact set 18, the operating finger 42 is moved upwardly as seen in Fig. 8 into the central notch 32 of plate 22. Next the operating arm 43 is moved to the right causing projection 44 to engage the finger 42 and advance plate 22 to the right against the tension of its supporting springs 24 and 25 to close the contacts 18. As the plate 22 approaches its extreme right-hand position the roller 29 enters the left-hand holding notch 26, the effect of which is to urge the plate 22 somewhat further to the right as seen in Fig. 9. Next the horizontal bar is restored, with the result that the spring finger 42 slides down out of the notch 32, enters the recess between the projections 44 and 45 and returns to its normal position as seen in Fig. 10. Since the plate 22 has been cammed slightly to the right by the action of roller 29 entering the holding notch 26, the gripping action of the projection 44 on the finger 42 in the notch 32 is withdrawn to permit the free restoration of the finger 42 when the horizontal bar is released as above explained. Finally the vertical bar is restored permitting the operating arm 43 to return to its normal position, as seen in Fig. 11. Thus the contact set 18 has been operated and locked, and the operating bars have restored, returning the finger 42 and the arm 43 to their normal positions, which they occupied before the bars were operated.

Figure 12:
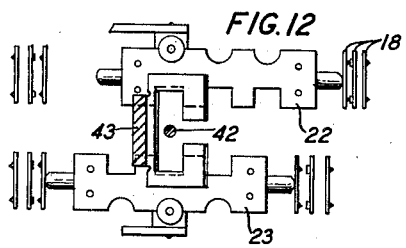
Figure 13:
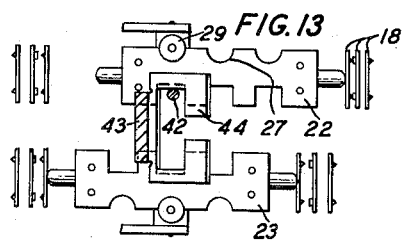
Figure 14:
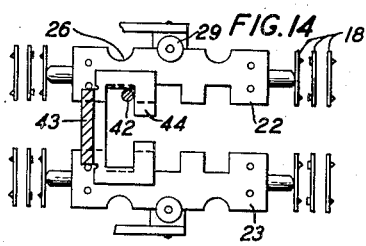

Assume now that it is desired to release the operated contacts 18. The manner in which this is accomplished is illustrated in Figs. 12 to 14, inclusive. First the vertical bar is operated to move the operating arm 43 from its normal position as illustrated in Fig. 7 to its operated position, shown in Fig. 12. Next the horizontal bar is operated to move the selecting finger 42 upwardly, as shown in Fig. 13, behind the projection 44 and into the notch 31 of plate 22. Next the vertical bar is released, and the arm 43 moves back to its normal position. In so doing, the inner surface of the projection 44 engages the finger 42 forcing it and the plate 22 to the left. As the plate 22 moves toward its normal position, contacts 18 open, and roller 29 rides out of the notch 26. As the plate 22 approaches its normal position the roller 29 drops into the central notch 27, and by its camming action fully restores the bar 22 to its central position as seen in Fig. 14. Finally the horizontal bar is released, and the flexible finger 42 restores to its normal position as shown in Fig. 7.

Figure 16:
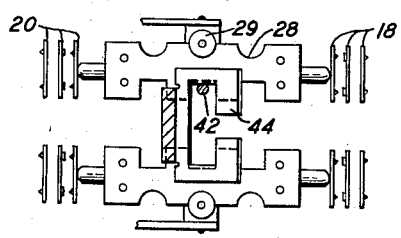
Figure 17:
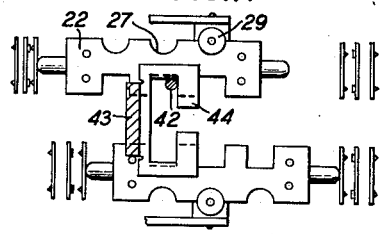
Figure 18:
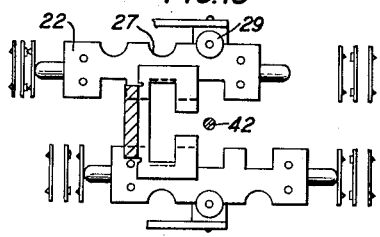

Assume next that the upper left-hand set of contacts 20 are to be operated. The operations involved in the selection and closure of contacts 20 are graphically illustrated in Figs. 15 to 18, inclusive. First the operating arm 43 is moved to its operated position as shown in Fig. 15. Next the horizontal bar is rotated upwardly to position the operating finger 42 behind the projection 44. This position is seen in Fig. 16. Next the operating arm 43 is restored to its normal position, during which movement the projection 44 engages the finger 42, which also rests in the center slot 32, and forces the operating plate 22 toward the left. As the plate 22 moves away from its normal position, the roller 29 rides out of the center notch 27. As the plate 22 approaches its operated position it closes the contact set 20, and the roller drops into the right-hand notch 28, giving the plate 22 a small additional movement to the left to free the grip of the projection 44 on the flexible finger 42. This position is seen in Fig. 17. Finally, the horizontal bar is released, and the flexible spring finger 42 escapes from the recess behind the projection 44 and returns to its normal position as seen in Fig. 18.

Figure 19:
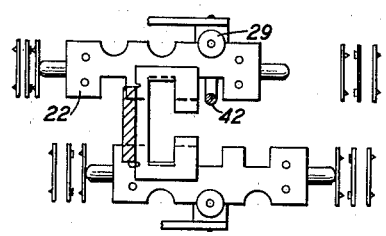
Figure 20:
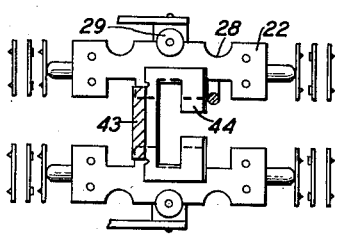
Figure 21:
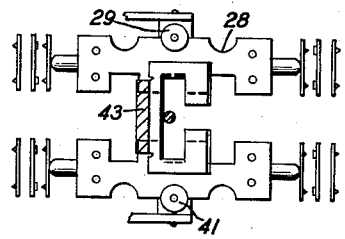

A description will now be given of the operations involved in the selective release of the contact set 20. These operations are illustrated in Figs. 19 to 21, inclusive. The first step is to rotate the horizontal bar upwardly to position the flexible finger 42 in the right-hand notch 33 of the plate 22. Then the vertical bar is rotated, and the projection 44 engages the finger 42 and forces the plate 22 toward the right. During this movement of the plate 22 the roller 29 rises out of the notch 28 and drops into the center notch 27. Here again the roller 29 produces a slight additional movement of the plate 22 to free the finger 42. The position of the parts at this stage is illustrated in Fig. 20. Next the horizontal bar is released, and the spring finger 42 restores to its normal position as shown in Fig. 21. Finally the vertical bar is released, and the operating arm 43 returns to the normal position shown in Fig. 7.

From an inspection of the drawings and particularly the Figs. 7 to 21, inclusive, it will be seen that the two bottom sets of contacts 19 and 21 may be selectively operated and released by the contact operating plate 23 when the vertical and horizontal bars are operated in the proper sequences. Since these sequential operations are similar to the ones already described in detail, it is not believed that a further detailed explanation is necessary.

Figure 23:
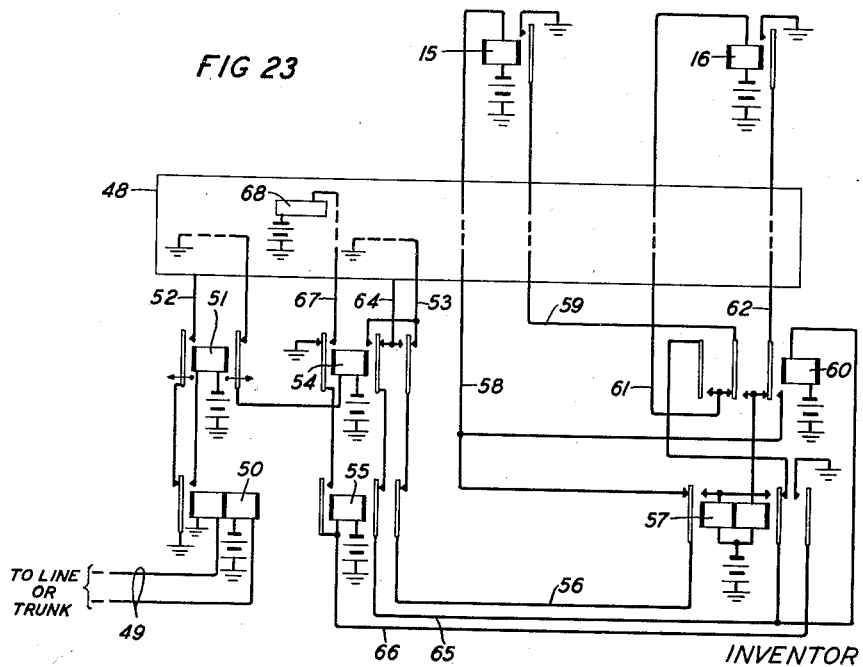
Fig. 23 illustrates a circuit suitable for operating the switch magnets.

While the switch to which the present invention is applicable is not limited to any particular use and may be employed in conjunction with numerous forms of operating circuits, one system of controlling circuits, which may be employed to advantage for controlling the operation of the switch magnets, is illustrated in Fig. 23. Associated with the switch is a register 48 which may be similar to any of the well-known register senders employed in cross-bar systems. The register 48 receives the numerical record transmitted thereto over the line or trunk 49 for the purpose of determining the sequential operation of the switch magnets. The line 49 terminates in the usual impulse relay 50 which energizes when the line is seized and which causes the operation of a slow release control relay 51. As the designation impulses are received by the relay 50 they are transferred over the impulse conductor 52 to set the register 48. At the proper time ground potential is applied to conductor 53 by the register, the circuit of which extends over the back contact of relay 54, back contact of relay 55, conductor 56, left back contact of relay 57, thence over conductor 58 through the register 48 to the winding of the desired horizontal operating magnet 15. Magnet 15 operates and rotates the horizontal bar 8 for the purpose already described. The operation of magnet 15 causes the closure of a circuit through the register, over the conductor 59, through the back contact of relay 60, thence over conductor 61, through the register 48, and the winding of the desired vertical operating magnet 16. Magnet 16 in operating completes a circuit over conductor 62 through the register and a back contact of relay 60, right-hand winding of relay 57 to battery. Relay 57 operates and locks through its left winding of front contact to ground on conductor 56. Relay 57 at its left back contact causes the release of the horizontal magnet 15. Magnet 15 in releasing releases the vertical magnet 16. Relay 57 also closes a circuit at its outer right contact for operating relay 55. Relay 55 energizes and locks through its left contact to ground at the back contact of relay 54. Relay 55 releases relay 57.

When the line or trunk 49 is released, relays 50 and 51 become deenergized, and relay 51 closes a circuit for relay 54. Relay 54 reverses the connection of conductors 53 and 64 and also releases relay 55. A circuit is now closed from ground on the conductor 53 through inner front contact of relay 54, back contact of relay 55, conductor 65, through the winding of relay 60. Relay 60 operates and completes a circuit from the ground on conductor 65, through the inner right back contact of relay 57, outer left contact of relay 60, conductor 61, through the register to the vertical magnet 16. The vertical magnet 16 completes a circuit over conductor 62 through the inner front contact of relay 60, conductor 58, thence through the register to horizontal magnet 15. Magnet 15 operates and closes a circuit over the conductor 59, the middle front contact of relay 60 to operate the relay 57. Relay 57 opens the circuit of vertical magnet 16, which releases and in turn releases the horizontal magnet 15. Relay 57 applies ground to conductor 66, operating relay 55. Relay 55 releases relay 60 and extends the grounded conductor 66 over the left front contact of relay 54 and conductor 67 to operate relay 68 in the register 48. In any suitable manner relay 68 causes the restoration of the register circuit. Thereupon the relays 54, 55 and 57 are released.

In a similar manner the register and controlling circuit selects and operates any desired ones of the vertical and horizontal magnets in the switch to selectively operate and release the desired sets of contacts.

What is claimed is:

1. In an automatic switch, two operating magnets, a plurality of separate contact sets controlled by said magnets, and means responsive to the operation of said magnets jointly for selectively operating any one of said sets of contacts.

2. In an automatic switch, two operating magnets, a plurality of separate contact sets controlled by said magnets, means responsive to the operation of said magnets jointly for selectively operating any one of said sets of contacts, and means for maintaining said contacts operated following the release of said magnets.

3. In an automatic switch, a plurality of contact sets arranged to be operated and released, magnets for controlling the operation and release of said contact sets, and means responsive to the operation of a pair of magnets jointly for selectively releasing the operated contacts of any one of said sets.

4. The combination in a selective switch of a pair of operating magnets, a plurality of separate contact sets controlled by said magnets, and means responsive to the operation of said magnets jointly for selectively operating and releasing any one of said sets of contacts.

5. In an automatic switch, two operating magnets, a plurality of separate contact sets controlled by said magnets, and means responsive to said magnets jointly when operated in different sequential orders for selectively operating said contact sets.

6. In an automatic switch, a plurality of separate contact sets arranged to be operated and released, two operating magnets for controlling the operation and the release of said contact sets, and means responsive to said magnets jointly when operated in different sequential orders to release selectively said sets of contacts.

7. The combination in an automatic switch of a pair of operating magnets, a number of contact sets controlled by said magnets, and means responsive to the energization and deenergization of said magnets jointly in different orders for selectively closing and opening said contact sets.

8. The combination in a cross-bar switch of a plurality of vertical operating magnets, a plurality of horizontal operating magnets, bars, one for each of said magnets, a plurality of separate contact sets arranged in groups, the contact sets of each group being associated with a particular one of said vertical magnets and a particular one of said horizontal magnets, and means including said bars responsive to the operation in different sequential orders of any one of the vertical magnets and any one of the horizontal magnets for selectively operating any set of contacts in the corresponding group.

9. The combination in a switch having contact sets arranged in horizontal rows and vertical rows, two intersecting bars, one common to two horizontal rows and the other common to two vertical rows, and means controlled by said bars for operating any one of the contact sets at the intersection of said bars.

10. The combination in a switch having contact sets arranged in horizontal rows and vertical rows, two intersecting bars, one common to two horizontal rows and the other common to two vertical rows, and means controlled by said bars for operating and for releasing any one of the contact sets at the intersection of said bars.

11. The combination in a switch having contact sets arranged in horizontal rows and vertical rows, two intersecting bars, one common to two horizontal rows and the other common to two vertical rows, and means for operating and releasing said bars in different sequential orders to select and operate and release any of the contact sets at the intersection of said bars.

12. A switch comprising intersecting rows of contact sets, each point of intersection having more than two separately operable contact sets, and two bars conjointly operable to select and operate any contact set at one of said points of intersection.

13. A switch having intersecting rows of contact sets, each point of intersection comprising more than two separately operable contact sets, and a pair of conjointly operable cross-bars for selecting and releasing any contact set at one of said points of intersection.

HARRY HOWARD SCHNECKLOTH.